United States Patent [19]
Ashley et al.

[11] Patent Number: 5,626,534
[45] Date of Patent: May 6, 1997

[54] CLUTCH CONTROL SYSTEM

[75] Inventors: Jonathan D. Ashley, Solihull; Charles J. Jones, Coventry, both of United Kingdom

[73] Assignee: Automotive Products, plc, Leamington Spa, United Kingdom

[21] Appl. No.: 525,687

[22] PCT Filed: Feb. 6, 1995

[86] PCT No.: PCT/GB95/00236

§ 371 Date: Sep. 29, 1995

§ 102(e) Date: Sep. 29, 1995

[87] PCT Pub. No.: WO95/21073

PCT Pub. Date: Aug. 10, 1995

[30] Foreign Application Priority Data

Feb. 5, 1994 [GB] United Kingdom ............... 94 02252

[51] Int. Cl.⁶ ............... B60K 41/22; F16H 59/02; F16H 59/04; F16H 59/70
[52] U.S. Cl. ............................... 477/79; 477/86
[58] Field of Search ............... 477/70, 79, 86

[56] References Cited

U.S. PATENT DOCUMENTS

| | | | |
|---|---|---|---|
| 3,910,388 | 10/1975 | Moori et al. | 192/3.56 |
| 4,499,793 | 2/1985 | Jow et al. | 477/78 |
| 4,629,045 | 12/1986 | Kasai et al. | 477/86 |
| 5,042,133 | 8/1991 | Peterson et al. | 29/407 |
| 5,065,849 | 11/1991 | Kono et al. | 477/86 |

FOREIGN PATENT DOCUMENTS

| | | |
|---|---|---|
| 243022 | 10/1987 | European Pat. Off. |
| 3313803 | 11/1983 | Germany . |
| 59-097325 | 6/1984 | Japan . |
| 2058963 | 4/1981 | United Kingdom . |
| 92-13208 | 8/1992 | WIPO . |

OTHER PUBLICATIONS

"Automotive Engineering" vol. 101, No. 9, Sep. 1993 p. 70.

*Primary Examiner*—Dirk Wright
*Attorney, Agent, or Firm*—Paul E. Milliken; Lee A. Germain

[57] ABSTRACT

A clutch control system for the automatic control of a motor vehicle clutch which connects an engine with a gearbox under the control of a driver-operated gear ratio selector lever. The control system includes an electronic control unit which controls initial clutch take-up on starting of the vehicle, clutch re-engagment following each ratio change, clutch disengagment on movement of the gear selector lever to change the operative ratio of the gearbox, and clutch disengagment on the coming to rest, etc. of the vehicle. The control system also incorporates an automatic calibration routine which is invoked on the inital keying-on of the system, said routine comprising a predetermined sequence of events in which the system responds to actions of the operator and at predetermined that the system is ready to proceed to the next stage of the calibration.

18 Claims, 4 Drawing Sheets

5,626,534

CLUTCH CONTROL SYSTEM

This invention relates to a clutch control system for the automatic control of a motor vehicle clutch which connects an engine with a gearbox under the control of a driver-operated gear ratio selector lever, the control system including an electronic control unit which controls initial clutch take-up on starting of the vehicle, clutch re-engagement following each ratio change, clutch disengagement on movement of the gear selector lever to change the operative ratio of the gearbox, and clutch disengagement on the coming to rest etc of the vehicle. Such a clutch control system is herein after referred to as a clutch control system of the kind specified.

Examples of such systems are described in the Applicants earlier European patents nos. 0038113, 0043660, 0059035 and 0101220 and European Application No. 0566595.

After assembly a clutch control system of the kind specified requires calibration before it can operate. Such calibration can prove to be a time consuming process which is difficult to incorporate into a vehicle assembly line manufacturing procedure.

It is an object of the present invention to provide a clutch control system of the kind specified which overcomes the above calibration problem.

Thus according to the present invention there is provided a clutch control system of the kind specified characterised in that the control unit incorporates an automatic calibration routine which is invoked on the initial keying-on of the system, said routine comprising a predetermined sequence of events in which the system responds to actions of the operator and at predetermined points in the calibration routine advises the operator that the system is ready to proceed to the next stage of the calibration.

In a typical clutch control system of the kind specified the clutch is spring engaged (eg by a diaphragm spring) and is disengaged by an hydraulic or other fluid pressure operated actuator the supply of fluid to, and exhaust of fluid from, which is controlled by the control unit via a solenoid-operated fluid flow control valve having a null position in which flow of fluid to and exhaust of fluid from the actuator is shut-off. The control unit also receives signals indicative of the position of an associated throttle, the state of engagement of the clutch, vehicle engine speed, vehicle speed, gearbox ratio currently selected, and loading (eg push or pull loading) on the gear selector lever.

When applying the present invention to such a clutch control system the calibration routine typically includes the measurement and saving to memory of signals representative of the following parameters:

location of the permissible neutral range of the gear selector lever;

position of the throttle in a foot-off condition;

position of the throttle in a foot-on condition;

position of the clutch in its engaged clamped condition;

solenoid valve current corresponding to a null position of a solenoid valve which controls the supply of fluid to and exhaust of fluid from an associated clutch actuator, and location relative to the permissible neutral range of a permissible range of gear selector lever positions for each ratio of the gearbox.

In a preferred arrangement calibration of the neutral range of positions of the selector lever and the foot-off throttle position takes place in parallel with calibration of the clutch clamped position and the null-position solenoid valve current, and after checking that all these calibrations have been sucessfully completed, the calibration routine issues a first operator advice signal.

Preferably the first and all subsequent operator advice signals comprise the sounding of an audible warning (eg a buzzer) and/or the activation of a visible warning (eg a flashing indicator light).

The calibration of the neutral range of the gear selector lever is obtained by the operator moving the lever to a neutral position, the system checking that no selecting force is currently being applied to the gear selector lever thus confirming that the opearator has placed the lever in the intended neutral position, and the system then measuring and saving to memory a signal representative of a neutral plane position and ascribing a permissable future range of neutral selection positions based on the measured neutral position.

The foot-off throttle calibration is achieved by the system simply recording the signal corresponding to a fully released throttle.

The clutch clamped position is calibrated by measuring and recording a signal from the clutch actuator corresponding to the fully engaged condition of the clutch.

The null-position current is calibrated by measuring and recording the solenoid current with the clutch fully disengaged and the solenoid valve in its null-position. Preferably the calibration routine includes the step of issuing a command to disengage the clutch whilst the null-position current is read and recorded.

Following the first operator advice signal the routine enters the foot-on throttle calibration stage in which the operator is required to fully depresses the throttle pedal to enable the control unit to record a signal corresponding to the fully depressed throttle position. After the system has recorded the foot-on throttle signal the buzzer and/or warning light is again activated to provide a second operator advice signal indicating that the routine is ready to begin the calibration of gear selection positions. The engine starter starting circuit is also enabled after the second operator advice signal.

The calibration of the selector lever positions corresponding to each forward ratio can be carried out with the vehicle either being driven over the ground or on a rolling road. This calibration can be achieved using the following routine:

the system checks that the gear selector lever is in the permissible neutral range;

the system detects whether a push or pull load is being applied to the selector lever by the operator to determine to which side of the neutral plane the selector lever has been moved;

the system checks that the gear lever has entered a permitted range of lever positions for the gear in question and starts a timed delay;

the system detects a signal corresponding to the extremity of movement of the gear lever into the particular gear selection position at the end of the timed delay;

the system compares the current engine and vehicle speeds to determine which gear is selected in the gearbox;

the system checks the compatibility of the determined gear ratio with the gear lever load signal;

the system ascribes a permissible range of lever positions, based on the detected extremity of movement of the gear lever, to the gear in question in the system memory, and the system issues an operator advice signal (using the buzzer) that the calibration of that particular gear lever position is complete and that the system is ready to calibrate any remaining gear lever positions.

When the buzzer has sounded indicating the completion of the last forward gear lever position calibration, the calibration routine preferably enters a checking stage in which the system checks that it has saved valid signals corresponding to a permissible range of gear lever positions for each forward ratio of the gearbox and that the vehicle speed has exceeded a predetermined level (eg 60 Kph). If both these criteria are met the forward gear lever position calibration is complete and a further operator advice signal is issued.

The final stage in the calibration is the calibration of the range of permissible gear lever positions for reverse gear selection. This calibration is undertaken in the same manner as the calibration for each of the forward ratios with the exception that the engine and vehicle speed comparison is not made since the reverse selection can be calibrated with the vehicle at rest. Following completion of the calibration of the reverse gear position a final buzzer is sounded indicating total completion of the entire calibration routine.

In accordance with a further aspect of the present invention there is provided a method of calibrating a clutch control system of the kind specified comprising keying-on the system thus invoking an automatic calibration routine stored in the control unit in which the system responds to the actions of the operator and at predetermined points in the calibration routine advises the operator that the system is ready to proceed to the next stage of the calibration.

The invention also provides a method of calibrating each of the forward gear selector lever positions of a clutch control system of the kind specified comprising moving the gear selector lever from neutral to each gear selector position in turn and whilst in or moving towards each position:

detecting whether a push or pull load is being applied to the selector lever by the operator to determine to which side of the selector lever neutral plane the selector lever has been moved;

checking that the selector lever has entered a permitted range of lever positions for the gear in question and starting a timed delay on entry into said range;

detecting a signal corresponding to the extremity of movement of the gear lever into the particular gear selection position;

comparing the current engine and vehicle speeds to determine which ratio is selected in the gearbox;

checking for compatibility of the determined gear ratio with the lever load signal;

ascribing a permissible range of lever positions, based on the detected extremity of movement of the gear lever to the gear in question in system memory, and issuing an operator advice signal that calibration of that particular gear lever position is complete and that any remaining gear lever position may now be calibrated using the same procedure.

The invention also provides a clutch control system of the kind specified in which the control unit incorporates an automatic calibration routine for carrying out the above method of calibrating each of the gear lever positions.

The present invention will now be described, by way of example only, with reference to the accompanying drawings in which.

Figure 1:
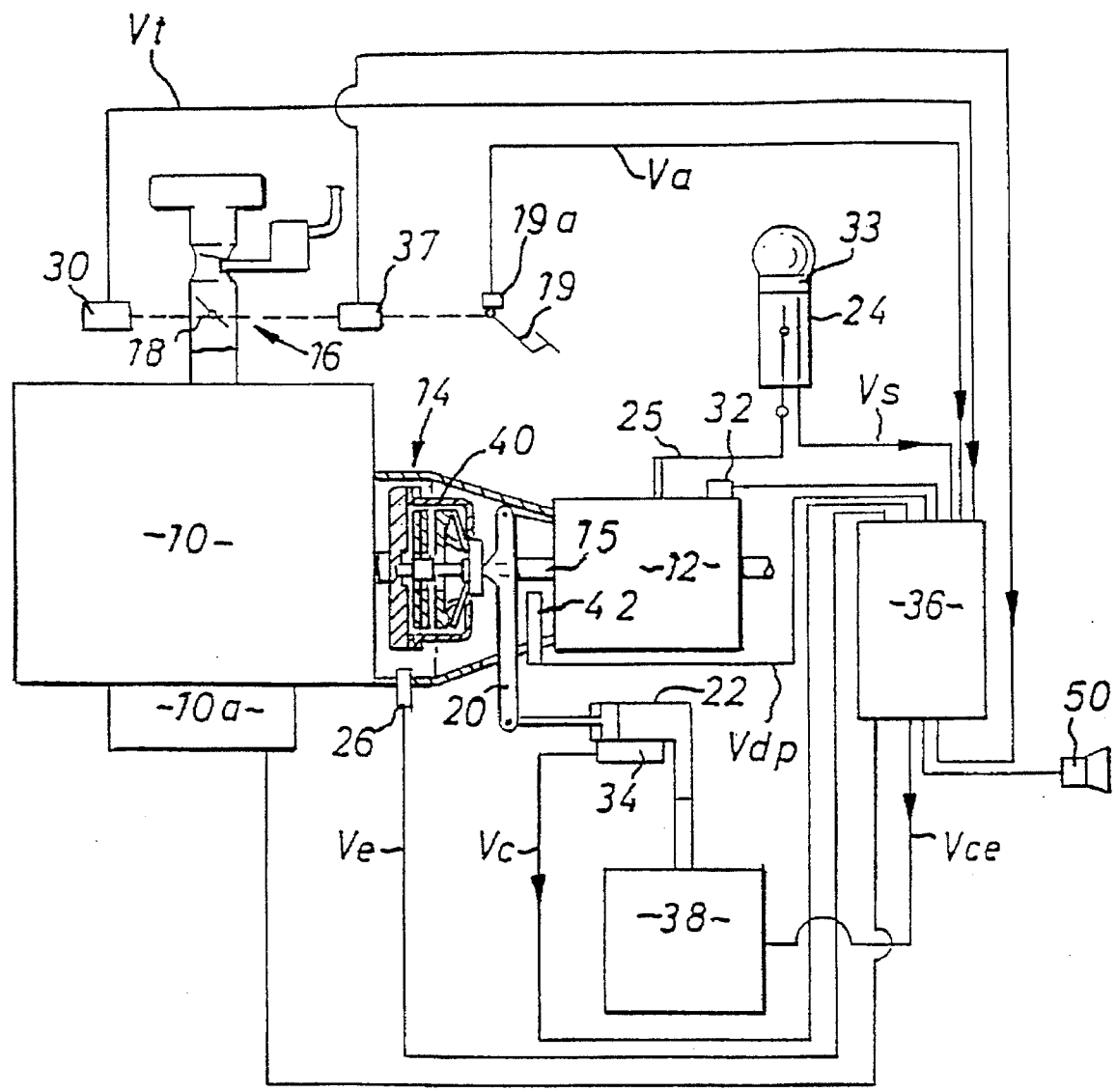
FIG. 1 shows in diagrammatic form the general layout of a clutch control system of the kind specified embodying the present invention.

Referring to FIG. 1 this shows an engine 10 with a starter and an associated starter circuit 10a which is coupled through a friction clutch 14 with a gearbox 12 via a gearbox input shaft 15. In the example described, fuel is supplied to the engine by a throttle 16 which includes a throttle valve 18 operated by accelerator pedal 19. The invention is equally applicable to electronic or mechanical fuel injected petrol or diesel engines.

The clutch 14 is actuated by a release fork 20 which is operated by a slave cylinder 22. The gearbox is controlled by a gear ratio selector lever 24 which is connected with the gearbox via a selector linkage 25 and which includes a load-sensing switch means 33 which detects forces applied to the lever 24 by the driver and produces a signal Vs indicating an intention to change gear.

An electronic control unit 36 controls the actuation of the clutch 14 via an hydraulic control 38 which controls the operation of slave cylinder 22. Control unit 36 receives signals Vs from gear lever 24 and signals Ve proportional to engine speed from engine speed sensor 26. Signals Vt from throttle valve position sensor 30 proportional to the current throttle opening and accelerator pedal postion signals Va from an accelerator positon sensor 19a are also fed to control unit 36. Control unit 36 also receives a gear signal Vg from gear position sensor 32 which corresponds to the gear ratio currently engaged, signals Vc from slave cylinder position sensor 34, which varying with the position of the slave cylinder, and signals Vdp proportional to clutch driven plate speed from speed sensor 42 which actually senses the speed of the gearbox input shaft 15 (which is equal to that of a driven plate 40 of the clutch 14). Since the speed of the vehicle depends on the driven plate speed and the gear engaged, the driven plate speed sensor 42 acts in effect as a vehicle speed sensor and vice versa. Thus in some applications no driven plate speed sensor 42 is provided and this speed is calculated from the gearbox ratio and the vehicle speed which is given by a vehicle speed sensor (not shown) of, for example, the variable reluctance type.

A throttle control 37 is operated by the control unit 36 so that the throttle can be opened and closed independently of the accelerator pedal 19.

A buzzer 50 is connected with control unit 36 to warn/indicate to the vehicle operator when certain vehicle operating conditions occur. In addition to or in place of buzzer 50 a flashing warning light (not shown) may be used.

Control unit 36 includes a reference signal generator which generates a reference signal Vr representative of a desired engine speed. This reference signal is compared with the actual engine speed signal Ve to produce an error signal E which is compared with the clutch actuator position signal Vc to provide a clutch engagement control signal Vce which control unit 36 outputs to hydraulic control 38. Operation of a control unit in this manner is described in more detail, for example, in the Applicants earlier European Patents 0038113 and 0043660. Since the general details of the control logic of the control unit 36 do not form part of the present invention further details will not be given here but the reader is directed to the Applicants various earlier patents and pending application referred to above if further details are required.

In addition to controlling the engagement and disengagement of clutch 14 the control unit 36 also controls the throttle setting via control 37 when its control logic indicates that an overide of the throttle opening set by the driver's operation of the accelerator 19 is desirable. In some applications the throttle control 37 may be omitted.

In accordance with the present invention the control unit 36 incorporates, in non-volatile memory, an automatic calibration routine (illustrated in flow diagram form in FIG. 2) which is invoked on the initial keying on of the system.

During the later stages of the manufacture of the control unit 36 when all the initial control parameter values are written into the unit's non-volatile memory all the calibration flags are cleared. There is a calibration flag for each stage of the calibration this flag is set when that stage of the calibration has been successfully completed. There is also a master flag the so-called "end of the line flag" (E.O.L. Flag) which is set when the entire calibration routine is complete.

Thus on initial keying-on of the system (see block A in FIG. 2) the E.O.L. flag is clear indicating that the end of line calibration routine is to be undertaken.

Figure 2:
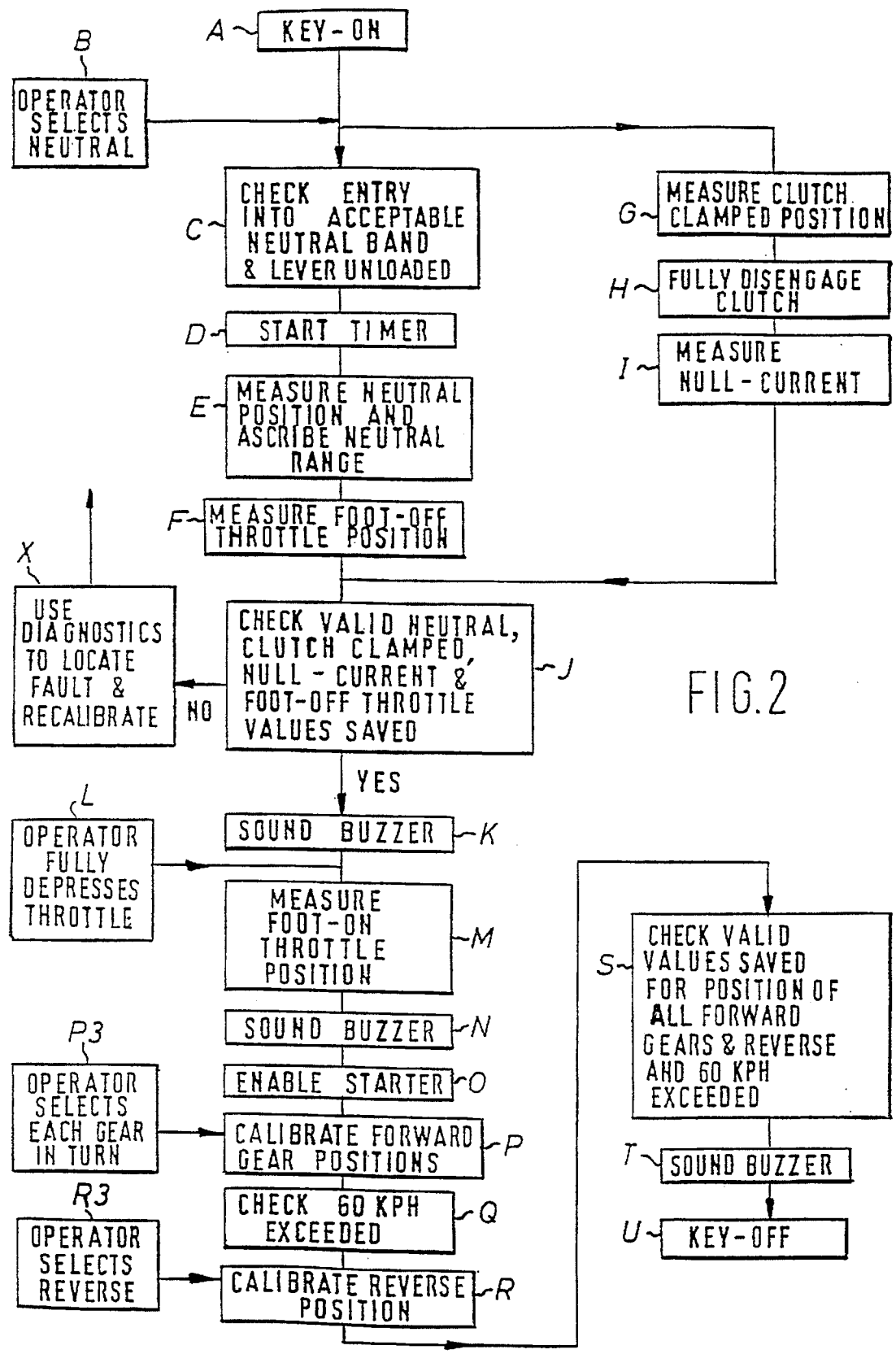
FIG. 2 shows in flow diagram form the main steps in the calibration routine of the present invention.

The calibration routine illustrated in FIG. 2 is set in motion by the vehicle operator placing the gear lever 24 in neutral (see action block B of FIG. 2).

When the gear lever is placed in neutral the software will detect entry into a pre-programmed allowable neutral band or range and check that the gear lever 24 is unloaded by reading the output from load sensing switch means 33 (see block C of FIG. 2). A 0.5 sec timer is then started (see block D of FIG. 2) and at the end of this delay the currently occupied gear lever position will be taken as the "neutral position". The boundaries of the permissable future neutral range are determined by the system from this neutral position and the neutral calibrated flag set (see block E of FIG. 2). The remaining gear positions are later referenced with respect to this neutral position.

If the permissable neutral range determined by the system is within predetermined limits the calibration of the foot off-throttle position is undertaken (see block F of FIG. 2) by recording the foot-off reading from accelerator pedal sensor 19a.

As can be seen from FIG. 2 at the same time that blocks C to F of the calibration are in progress the calibration of the clutch clamp position and the hydraulic control unit 38 is also taking place via block G to I.

Hydraulic control 38 comprises a powerpack (not shown) which includes an electric motor-driven hydraulic pump which is powered-up on keying-on of the system and an accumulator which delivers pressured hydraulic fluid to slave cylinder 22 via a solenoid-operated fluid flow control valve (also not shown). Details of a suitable powerpack are contained in the Applicant's earlier European Patent No. 0430943.

At block G the clutch clamped position is calibrated by recording to non-volatile memory a signal from sensor 34 representing the clamped position of the clutch.

The hydraulic control 38 is calibrated by saving to non-volatile memory a signal representing the steady current which must be applied to the solenoid of the fluid flow control valve to obtain the null-position of the valve when the clutch is fully disengaged with the pump not running to ensure a steady state condition.

This null-current must be read when the clutch is disengaged (as opposed to engaged) since this is the condition in which the clutch cylinder 22 is fully in control of the state of engagement of the clutch.

To obtain this current signal the system is set up so that the calibration routine itself includes the step of issuing a clutch disengage signal to the hydraulic control 38 (see block H of FIG. 2). The null-position current is then read into non-volatile memory (see block I of FIG. 2).

The sucessful completion of steps C to F and G to I of the calibration is checked (see block J of FIG. 2) by checking that acceptable values representative of the neutral range, throttle-off, clutch clamped position and null-current have all been saved to memory. If so, the buzzer is sounded (see block K of FIG. 2) to indicate sucessful completion of blocks C to I of the calibration. If no buzzer is sounded at this point, indicating a calibration problem, it is necessary for the operator to determine, using an electronic diagnostic tool plugged into the control unit, where the problem lies and to correct this problem before attempting to re-calibrate whichever step of the calibration has previously failed. (see block X of FIG. 2).

Following the successful obtaining of a buzzer at step K, the operator fully depresses the accelerator pedal 19 (see action block L of FIG. 2) so that the calibration of the foot-on throttle can take place (see block M of FIG. 2) during which a first snapshot of the foot-on throttle position is taken and saved to memory. In fact, the foot-on throttle position is monitored until the entire calibration routine is complete and if any foot-on value is recorded which is higher than the initial snapshot this higher value becomes the saved value.

After the saving of the snapshot of foot-on throttle position to memory the buzzer is sounded (see block N of FIG. 2) to indicate to the operator the completion of the static section of the calibration which is done with the vehicle stationary and the stater circuit 10a is enabled (see block O of FIG. 2) to allow starting of the engine.

If necessary the calibration can be halted at this point and the calibrations achieved will not be lost if the system is keyed-off. On the next keying-on the calibration routine would pick up at this point with the stater circuit enabled.

The sounding of the buzzer at block N indicates the start of the calibration process for the forward gears (see block P of FIG. 2). This can take place as the vehicle is driven off the production line from rest and up through the gears or on a rolling road which forms part of the production line. The calibration procedure for each of the forward gears (shown in more detail in FIG. 3 which expands the block P of FIG. 2) is the same for each gear and is based on the following principles.

Figure 3:
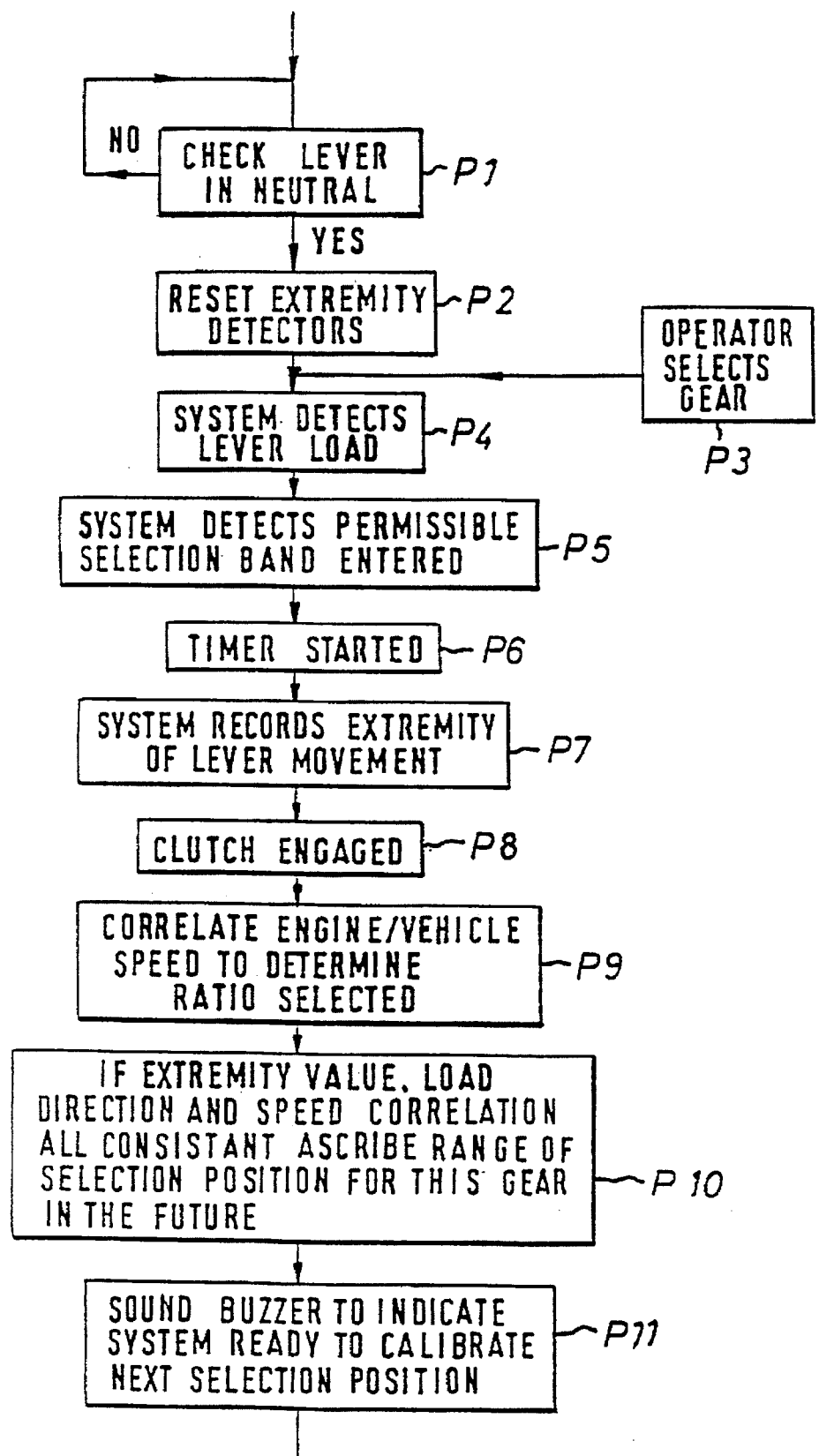
FIG. 3 shows in flow diagram form the details of the calibration of the gear selector lever positions.
Figure 4:
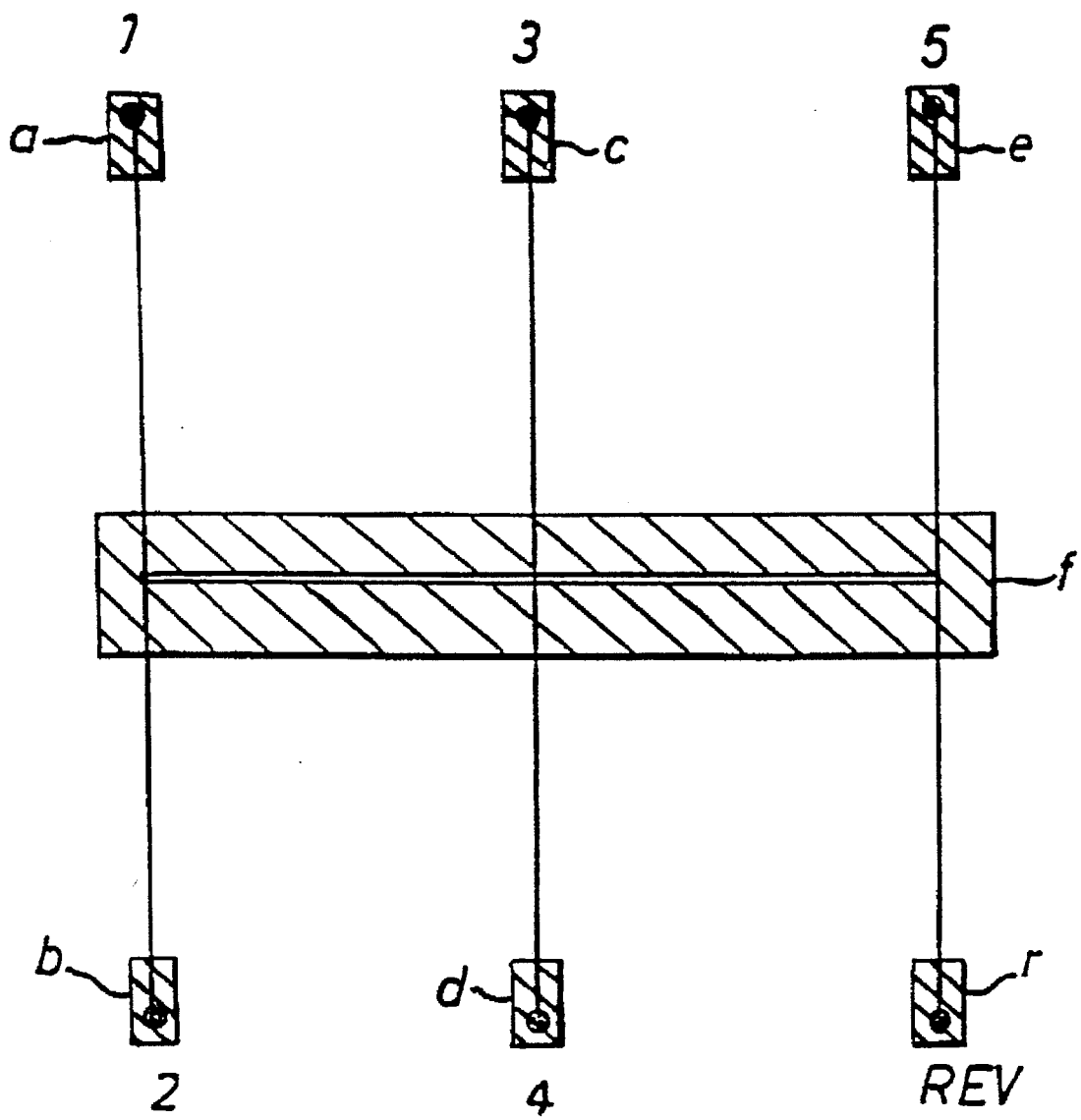
FIG. 4 shows the permissable selection ranges ascribed to each gearbox ratio.

The process for each gear is started by checking that the gear lever is in the previous prescribed neutral range (see block P1 of FIG. 3). When this position is detected for the first time any existing gear lever positions or range values are reset so that the system is ready to receive the new calibration values. As the gear selector lever 24 is moved to each gear selection position in turn (see action block P3 of FIG. 3) the gear lever is monitored to see if it is being pushed or pulled (see block P4 of FIG. 3). Neutral is arranged to be close to the mid travel of the transducer with the positions for the gears on either side of neutral (see FIG. 4).

Thus, depending on the direction of travel of the gear selector lever the transducer from neutral, a maximum or minimum output from the gear transducer 32 is sought as each gear is selected. When the transducer indicates that a band corresponding to the permitted limits for the particular gear lever position has been entered (see block P5 of FIG. 3) there is a 0.5 second time delay (see block P6 of FIG. 2) before the clutch is engaged. This delay is to allow for the operator to fully complete the movement of the lever to the extremity of its movement after entering the permitted band of lever positions for the gear in question. This extremity of movement of the lever is recorded (see block P7 of FIG. 3).

After the clutch is engaged (see block P8 of FIG. 3) the engine speed and road speed pulses are counted and the ratio of their pulse rates determined. By reference to a look-up table (written into non-volatile memory of the control unit 36 during production) the actual gear engaged can be determined from the count ratio (see block P9 of FIG. 3). The actual gear determined from the count ratio is checked against the preceeding push or pull signal from the gear lever sensor 33. If a valid ratio is found together with the appropriate push or pull signal the system ascribes a future permissable band of lever positions for the selection of the gear ratio in question (see block P10 of FIG. 3) and sounds the buzzer (see block P11 of FIG. 3) to indicate to the operator that he should shift to the next gear selection position so that the system can repeat blocks P1 to P11 described above. In this manner all the forward gear selection positions are calibrated one after each other.

When all the forward gear selection positions have been calibrated the system checks that the vehicle has exceeded a predetermined road speed eg. 60 k.p.h (see block Q of FIG. 2) to ensure that the calibration of the forward gear selection positions which has taken place is not accidental but is representative of the movements of the gear lever in a real driving situation.

After all the forward gears have been calibrated the next step in the process is to calibrate the reverse gear selection position (see block R of FIG. 2). Calibration of reverse is the same as each of the forward gears except that the speed correlation step (block P9 in the forward sequence) is omitted thus the calibration can be done with the vehicle stationary. The reverse calibration routine thus including steps R1 to R8 and R10 corresponding to steps P1 to P8, P10 and P11 described above.

When all the forward gear positions and the reverse gear position have been calibrated the system checks that it has ascribed permissable future gear lever ranges for each forward ratio and for reverse (see block S in FIG. 2). This is shown diagrammatically in FIG. 4 in which the gear lever selection gate for a five speed gearbox is shown and each ratio has a permissable selection range of positions (eg. ratio 1 has range a, ratio 2 has range b, ratio 3 has range c, ratio 4 has range d, ratio 5 has range e and reverse has range r). These ranges are located as appropriate for the gear in question on the appropriate side of the neutral permissable range f.

If valid bands have been determined and saved for all the forward gears and for reverse and a flag has been set confirming that the vehicle speed has exceeded the predetermined road speed, (60 kph), the buzzer is sounded (see block T of FIG. 2) to indicate the completion of the entire calibration routine. Following which the system can be keyed-off (see block U of FIG. 2).

As is evident from the above, the calibration routine proceeds largely automatically with the operator being advised periodically when he is required to carry out an action. For example, after the sounding of the first buzzer the operator knows that he must fully depress the accelerator for calibration of the foot-on throttle position and the sounding of the second buzzer indicates to the operator that the calibration of the foot-on throttle position is complete and the calibration of the forward gear positions has commenced and that he is therefore required to shift to each forward gear position in turn with the buzzer sounding at the completion of the calibration of each gear position. After the final checking step S of the routine a final buzzer also sounds to advise the operator that the full calibration routine has been completed.

It is the above advising of the operators by the sounding of the buzzer which signifies the necessary interaction between the operator and the system and makes the control system of the present invention so easy and fast to calibrate.

Also the manner in which the system ensures compatability between gear selector lever loading signal and the gear ratio determined from the engine speed and vehicle speed ratio correlation, during the calibration of the forward gear selection positions, is seen as an important feature of the present invention.

Alternatively, if deemed desired, the operator may be guided through the calibration routine either by a written prompt sheet through which he works systematically or by an electronic diagnostic unit which is plugged into the control unit 36 and which displays, at the appropriate moment in the calibration, an indication to the operator as to the current stage of calibration which is in progress and any actions which are required of him. As a further alternative in a production line situation the operator may be advised as to the current stage of the calibration and as to any actions which are required of him by an overhead electronic display which is connected with the control unit 36.

The calibrations which are determined during the above described end of production line situation may need to be repeated (in part) when replacement parts are fitted. Individual calibrations may be carried out but require the use of the diagnostic facility and prescribed procedures to alter the individual calibrations.

We claim:

1. A clutch control system for the automatic control of a motor vehicle clutch which connects an engine with a gearbox under the control of a driver-operated gear ratio selector lever, the control system comprising an electronic control unit which controls initial clutch take-up on starting of the vehicle, clutch re-engagement following each ratio change, clutch disengagement on movement of the gear selector lever to change the operative ratio of the gearbox, and clutch disengagement on the coming to rest of the vehicle, the control unit including an automatic calibration routine which is invoked on the initial keying-on of the system, said routine comprising a predetermined sequence of events (A to U) in which the system responds to actions (B,L,P3,R3) of an operator of the vehicle and at predetermined points (K,N,P11,T) in the calibration routine advises the operator that the system is ready to proceed to the next stage of the calibration.

2. A control system according to claim 1 wherein the calibration routine includes the measurement and saving to memory of signals representative of at least one of the following parameters:

location (E) of a permissible neutral range of the gear selector lever (24);

position of an associated vehicle throttle (16) in a foot-off condition (F);

position of an associated vehicle throttle (16) in a fully depressed foot-on condition (M);

position of the clutch (14) in its engaged clamped condition (G);

solenoid valve current (I) corresponding to a null position of a solenoid valve which controls the supply of fluid to and exhaust of fluid from an associated clutch actuator (22), and location (P,R) relative to the permissible neutral range (E) of a permissible range of gear selector lever positions for each ratio of the gearbox (12).

3. A control system according to claim 2 wherein calibration (E) of the location of the neutral range of positions of the gear selector lever (24) and the foot-off throttle position (F) takes place in parallel with calibration (G) of the clutch clamped position and the null-position solenoid valve current (I), and in that after checking (J) that all these calibrations have been successfully completed, the calibration routine issues a first operator advice signal (K).

4. A control system according to claim 3 wherein the first and all subsequent operator advice signals (K,N,P11,T) comprise the sounding of an audible warning (50) and/or the activation of a visible warning.

5. A clutch control system according to claim 4 wherein the calibration (E) of the neutral range of the gear selector lever is obtained by the operator moving the lever (24) to a neutral position, the system checking that no selecting force is currently being applied to the gear selector lever thus confirming that the operator has placed the lever in the intended neutral position, and the system then measuring and saving to memory a signal representative of a neutral plane position and ascribing a permissible future range (f) of neutral selection positions based on the measured neutral position.

6. A control system according to claim 2 wherein the foot-off throttle calibration (F) is achieved by the system recording the signal corresponding to a fully released throttle (16).

7. A control system according to claim 2 wherein the clutch clamped position is calibrated (G) by measuring and recording a signal from the clutch actuator (22) corresponding to the fully engaged condition of the clutch (14).

8. A control system according to claim 2 wherein the null-position solenoid valve current is calibrated (I) by measuring and recording the solenoid current with the clutch (14) fully disengaged and the solenoid valve in its null position.

9. A control system according to claim 8 wherein the calibration routine includes the step (H) of issuing a command to disengage the clutch (14) whilst the null-position current is read and recorded (I).

10. A control system according to claim 3 wherein following the first operator advice signal (k) the routine enters a foot-on throttle calibration stage (M) in which the operator is required (L) to fully depress the throttle pedal (19) to enable the control unit (36) to record a signal corresponding to the fully depressed foot-on throttle position, a second operator advice signal (N) being issued by the system after the foot-on throttle signal is recorded indicating that the routine is ready to begin the calibration (P) of the permissible range of gear selector lever positions for each ratio of the gearbox (12).

11. A control system according to claim 10 wherein an engine starting circuit is enabled (O) after the second operator advice signal (N).

12. A control system according to claim 2 wherein calibration (P) of the permissible range of gear lever positions for each forward ratio of the gearbox is achieved using the following routine:

the system checks (P1) that the gear selector lever is in the permissible neutral range;

the system detects (P4) whether a push or pull load is being applied to the selector lever 24 by the operator to determine to which side of the neutral plane the selector lever has been moved;

the system checks (P5) that the gear lever (24) has entered a permitted range of lever positions for the gear in question and starts (P6) a timed delay;

the system detects (P7) a signal corresponding to the extremity of movement of the gear lever (24) into the particular gear selection position at the end of the timed delay;

the system compares (P9) current engine and vehicle speeds to determine which gear ratio is currently selected in the gearbox;

the system checks (P10) the compatibility of the determined gear ratio with the gear lever load signal; the system ascribes (P10) a permissible range of lever positions, based on the detected extremity of movement of the gear lever (24), to the gear in question in the system memory, and the system issues an operator advice signal (P11) to indicate that the calibration of that particular gear lever position range is completed and that the system is ready to calibrate any remaining gear lever position ranges.

13. A control system according to claim 12 wherein after the issuance of the operator advice signal (P11) indicating completion of the calibration range for the last forward ratio the routine enters a checking stage (Q) in which the system checks that it has saved valid signals corresponding to a permissible range of gear lever positions for each forward ratio of the gearbox (12) and that the vehicle speed has exceeded a predetermined level.

14. A control system according to claim 13, wherein calibration (R) of the range of permissible gear selector lever positions for reverse gear selection is made using the following routine for the calibration of the forward ratio positions:

the system checks (P1) that the gear selector lever is in the permissible range;

the system detects (P4) whether a push or pull load is being applied to the selector lever 24 by the operator to determine to which side of the neutral plane the selector lever has been moved;

the system check (P5) that the gear lever (24) has entered a permitted range of lever positions for the gear in question and starts (P6) a timed delay;

the system detects (P7) a signal corresponding to the extremity of movement of the gear lever (24) into the particular gear selection position at the end of the timed delay;

the system checks (P10) the compatibility of the determined gear ratio with the gear lever load signal;

the system ascribes (P10) a permissible range of lever positions, based on the detected extremity of movement of the gear lever (24), to the gear in question in the system memory, and the system issues an operator advice signal (P11) to indicate that the calibration of the particular gear lever position range is completed and that the system is ready to calibrate any remaining gear lever position ranges.

15. A control system according to claim 14 wherein the operator advice signal (T) issued after the completion of the calibration of the range of permissible gear selector lever positions for reverse gear selection indicates the completion of the entire system calibration routine.

16. A method of calibrating a clutch control system for the automatic control of a motor vehicle clutch which connects an engine with a gearbox under the control of a driver-operated gear ratio selector lever, the control system comprising an electronic control unit which controls initial clutch take-up on starting of the vehicle, clutch re-engagement following each ratio change, clutch disengagement on movement of the gear selector lever to change the operative ratio of the gearbox, and clutch disengagement on the coming to rest of the vehicle, comprising the step of keying on the system thus invoking an automatic calibration routine stored in the control unit in which the system responds to the actions of the operator and at predetermined points in the calibration routine advises an operator of the vehicle that the system is ready to proceed to a next stage of the calibration.

17. A method of calibrating each forward gear selector lever position of a clutch control system for the automatic control of a motor vehicle clutch which connects an engine with a gearbox under the control of a driver-operated gear ratio selector lever, the control system comprising an electronic control unit which controls initial clutch take-up on starting of the vehicle, clutch re-engagement following each ratio change, clutch disengagement on movement of the gear selector lever to change the operative ratio of the gearbox, and clutch disengagement on the coming to rest of the vehicle, comprising the step of moving the gear selector lever from a neutral plane to each gear selector position in turn and while in or moving towards each position performing the steps of:

detecting whether a push or pull load is being applied to the selector lever by an operator of the vehicle to determine to which side of the neutral plane the selector lever has been moved;

checking that the selector lever has entered a permitted range of lever positions for the gear in question and starting a timed delay on entry into said range;

detecting a signal corresponding to the extremity of movement of the gear selector lever into a particular gear selection position;

comparing current engine and vehicle speeds to determine which ratio is selected in the gearbox;

checking for compatibility of a determined gear ratio with the lever load signal;

ascribing a permissible range of lever positions, based on the detected extremity of movement of the gear lever to the gear in question in system memory, and issuing an operator advice signal that calibration of that particular gear lever position is complete and that any remaining gear lever position may now be calibrated using the same procedure.

18. The method of claim 17 wherein the control unit incorporates an automatic calibration routine for carrying out the gear lever position calibration.

* * * * *